United States Patent
Yeom et al.

(10) Patent No.: US 7,114,244 B2
(45) Date of Patent: Oct. 3, 2006

(54) DISC CENTERING DEVICE

(75) Inventors: Ki-keon Yeom, Suwon (KR); Sang-jin Choi, Suwon (KR); Young-kun Kwon, Suwon (KR); Hyun-jin Lee, Suwon (KR); Dong-ok Kwak, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 10/676,144

(22) Filed: Oct. 2, 2003

(65) Prior Publication Data

US 2004/0117979 A1    Jun. 24, 2004

(30) Foreign Application Priority Data

Dec. 24, 2002    (KR) .................. 10-2002-0083343

(51) Int. Cl.
 *B23P 19/00*    (2006.01)
(52) U.S. Cl. .............. 29/737; 29/603.03; 29/743; 29/759; 29/833; 29/834
(58) Field of Classification Search .............. 29/737, 29/603.03, 759, 833, 834, 743; 360/1, 103, 360/106; 33/568, 552, 180 R
See application file for complete search history.

(56) References Cited

U.S. PATENT DOCUMENTS

| | | | | |
|---|---|---|---|---|
| 4,456,935 | A | * | 6/1984 | Janosi ................ 360/99.04 |
| 4,563,824 | A | * | 1/1986 | Baun ...................... 33/568 |
| 5,120,292 | A | * | 6/1992 | Ueda et al. ............. 493/124 |
| 5,481,423 | A | * | 1/1996 | Aoki .................. 360/99.06 |
| 6,158,112 | A | | 12/2000 | Kim et al. |
| 6,453,541 | B1 | | 9/2002 | Guthrie et al. |

FOREIGN PATENT DOCUMENTS

| | | |
|---|---|---|
| CN | 88100767 | 3/1992 |
| JP | 2002-117646 | 4/2002 |
| KR | 1998-58446 | 10/1998 |
| KR | 10-223210 | 7/1999 |
| KR | 2000-26236 | 5/2000 |

OTHER PUBLICATIONS

Office Action issued by the KIPO on Jan. 19, 2005.
Office Action issued by the SIPO on Feb. 4, 2005.
U.S. Appl. No. 10/676,025, filed Oct. 2, 2003, Yeom et al., Samsung Electronics Co., Ltd.
U.S. Appl. No. 10/676,145, filed Oct. 2, 2003, Ha, Samsung Electronics Co., Ltd.

* cited by examiner

*Primary Examiner*—A. Dexter Tugbang
*Assistant Examiner*—Tai Van Nguyen
(74) *Attorney, Agent, or Firm*—Staas & Halsey LLP

(57) ABSTRACT

A disc centering device includes a base plate, a chuck which is installed on the base plate, a hub unit which is detachably engaged to the chuck and receives discs and spacers to be stacked, disc pushers which are slidably provided outside the hub unit and include corresponding pressure members which center the discs by pushing circumferences of the discs, a driving unit which slides the disc pushers, and biasing units which are slidably provided outside the hub unit and push circumferences of the spacers. Accordingly, by performing a spacer biasing along with a disc centering, the accuracy of a centering is increased, thereby providing the discs having data recorded thereon with a uniform quality. Additionally, vibration of a rotation body can be minimized due to the simple configuration of the disc centering device. Furthermore, the productivity and manufacturability of HDDs are improved in view of the simplified maintenance and repair of the same.

23 Claims, 12 Drawing Sheets

[Before Spacer Biasing]

[After Spacer Biasing]

DISC CENTERING DEVICE

CROSS-REFERENCE TO RELATED APPLICATIONS

This application claims the benefit of Korean Patent Application No. 2002-83343, filed Dec. 24, 2002, in the Korean Intellectual Property Office, the disclosure of which is incorporated herein by reference.

BACKGROUND OF THE INVENTION

1. Field of the Invention

The present invention relates to a disc centering device which centers a stack of discs.

2. Description of the Related Art

Generally, an HDD (Hard Disc Drive) is an auxiliary memory unit which records and retrieves data using its magnetized aluminum disc. Recording data after assembling 1 or 2 HDDs is difficult where one or more high density and high capacity HDDs are used. To solve this, a method of assembling HDDs after mounting a plurality of HDDs on a chuck and recording data thereon, has been introduced.

In this method, to prevent vibration generated by a rotation due to a recording of data, a centering process that enables a plurality of discs to have the same disc center is performed using a centering device.

According to a conventional disc centering device, a plurality of discs are centered by pushing circumferences of the discs using a pushing unit. This disc centering device is disclosed in Korean Patent Application No. 1996-53058, filed by the present applicant.

The above disc centering device is suitable for centering a relatively small number of discs, for example, 2 or 3 discs, but may not be suitable for centering 10 or more discs due to a configurational limit of respective parts of the disc centering device, including the pushing unit, and difficulty in securing accurate locations of the discs. Also, to fix the plurality of discs with the conventional disc centering device, a user has to manually manipulate the plurality of discs by his/her own hands. Accordingly, the efficiency and reliability of centering the discs are lowered.

To solve some of the problems described above, a disc chuck can be used to chuck the plurality of discs, and simultaneously perform a centering operation with respect to the discs.

However, the centering operation described above is performed in the interior of the discs, and thus a chucking state has to be continuously maintained during a recording of data, which may cause a transformation of the discs. Additionally, because the disc chuck performs the chucking and centering operations simultaneously, an interior configuration becomes complicated, making it difficult to maintain and repair the disc centering device. Furthermore, because the weight of the disc chuck is increased, a centrifugal force generated during a rotation is increased, creating a vibration problem due to the rotation of the discs.

SUMMARY OF THE INVENTION

Accordingly, it is an aspect of the present invention to provide a disc centering device which secures accurate locations of discs by improving a centering process of the discs.

Additional aspects and advantages of the invention will be set forth in part in the description which follows and, in part, will be obvious form the description, or may be learned by practice of the invention.

To achieve the above and/or other aspects of the present invention, there is provided a disc centering device for centering discs which are spaced by spacers, comprising a base plate, a chuck which is installed on the base plate, a hub unit which is detachably engaged to the chuck and receives the discs to be stacked, disc pushers which are slidably provided outside the hub unit and include corresponding pressure members which push circumferences of the discs and center the discs, a driving unit which slides the disc pushers, and biasing units which are slidably provided outside the hub unit and push circumferences of the spacers.

The chuck may include a collet which grabs or relieves the hub unit according to whether a compressed air is provided to the chuck.

The hub unit may comprise a hub body which is detachably engaged to the chuck and receives the discs, and a hub cap which moves up or down to compress the discs with respect to the hub body. The hub cap may move up or down according to whether a compressed air is provided to the hub unit.

The disc pushers may be provided in a radial direction relative to the hub unit. The disc pushers may include first, second and third disc pushers which are provided at intervals of 120 degrees with respect to the hub unit.

The driving unit may include a motor, a belt pulley which is connected to the motor and the disc pushers, and a link which is linearly moved by the belt pulley and simultaneously moves the disc pushers back or forth.

The driving unit may include cylindrical actuators which drive the corresponding disc pushers.

Each of the pressure members may include a plate spring which is adapted to simultaneously pressurize the circumferences of the discs having different diameters.

Each of the biasing units may include a holder having one or more rods which push the spacers, and a holder driving unit which moves the holder back or forth.

The biasing units may be installed in a radial direction relative to the hub unit. The biasing units may include first, second and third biasing units which are installed at intervals of 120 degrees with respect to the hub unit.

A number of rods may correspond to a number of the stacked spacers so as to simultaneously pressurize the spacers.

Each of the holder driving units may include a motor, and a rack and pinion which moves the corresponding holder having one or more rods back or forth by being moved linearly according to a rotation of the motor. The holder driving units may be cylindrical actuators.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
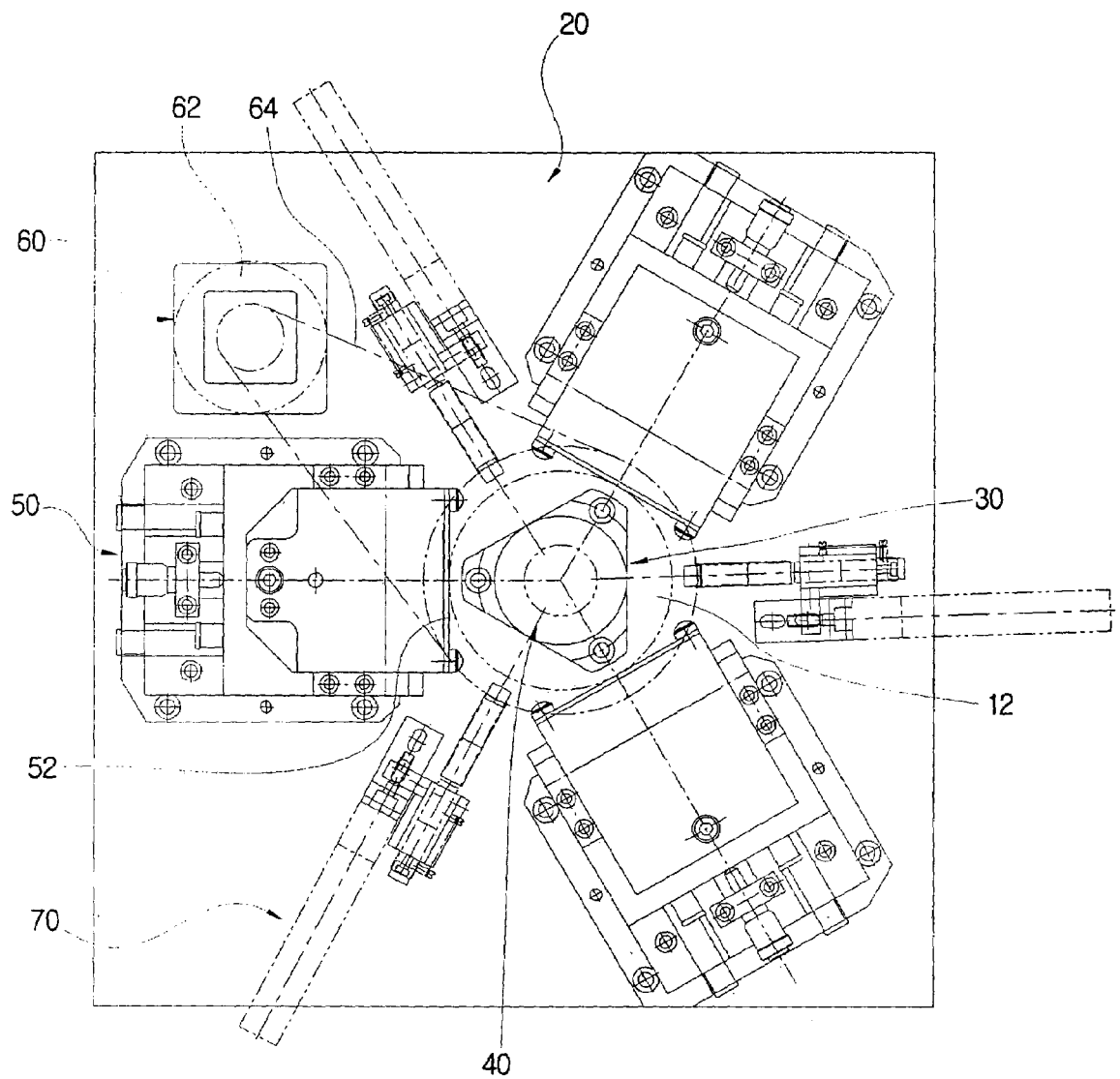
FIG. 1 is a partial plan view illustrating a disc centering device according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
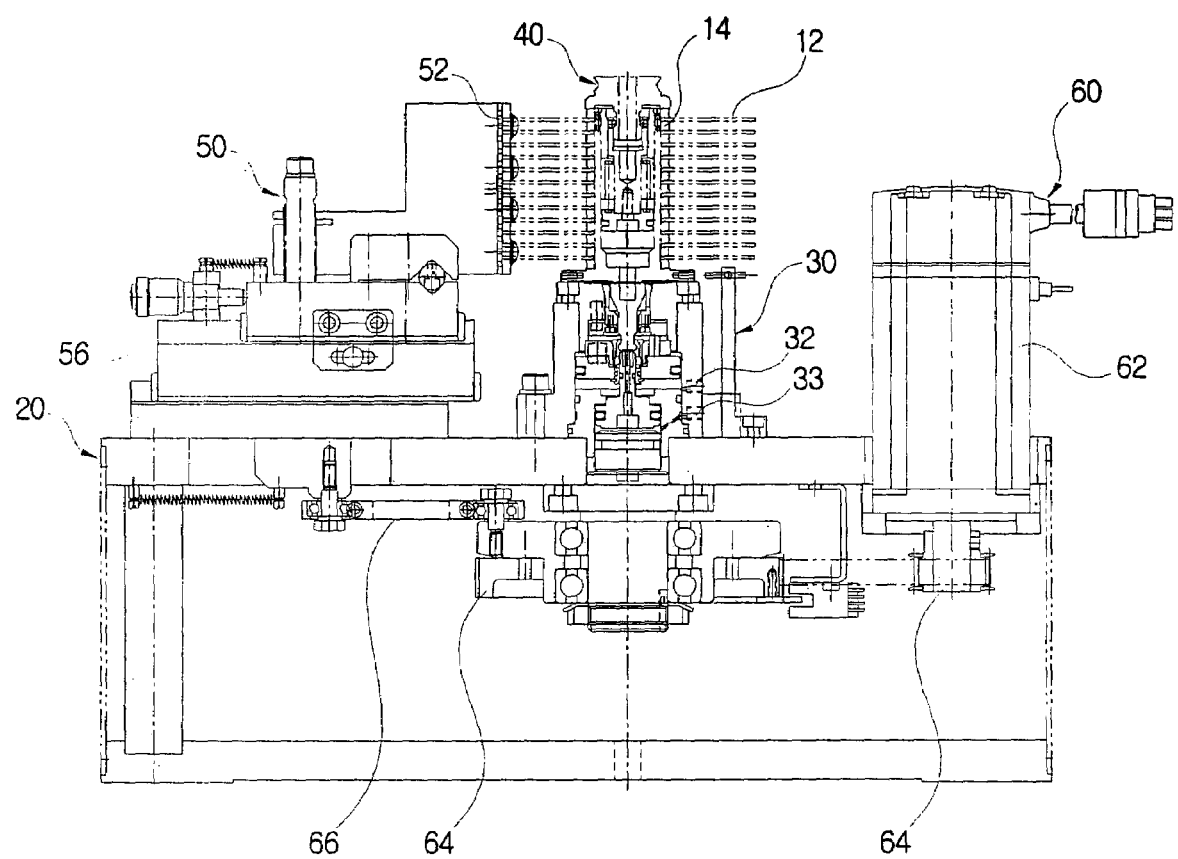
FIG. 2 is a front view of the disc centering device shown in FIG. 1.

FIG. 1 shows a plan view of a disc centering device according to an embodiment of the present invention. FIG. 2 is a front view illustrating the disc centering device shown in FIG. 1.

As shown in FIGS. 1 and 2, the disc centering device includes a base plate 20, a chuck 30 provided on the base plate 20, a hub unit 40 which is detachably engaged to the chuck 30 and receives discs 12 and spacers 14 to be stacked, disc pushers 50 which are slidably provided outside the hub unit 40 and include corresponding pressure members 52 which push circumferences of the discs 12 and center the discs 12, a driving unit 60 which slides the disc pushers 50, and biasing units 70 which are slidably provided outside the hub unit 40 and bias the spacers 14 relative to an axis of the hub unit 40 (hereinafter, a spacer biasing) by pushing circumferences of the spacers 14.

The chuck 30 fixes the hub unit 40, and a first air port 32 and a second air port 33 are formed on an outside thereof. The hub unit 40 is chucked on the chuck 30, and the discs 12 stacked with respect to the hub unit 40 are supported by a compressed air passing through the first and second air ports 32 and 33.

Spacers 14 are interposed between the discs 12 so as to space each of the discs 12 apart from each other.

The hub unit 40 has a cylindrical structure so as to allow the discs 12 and the spacers 14 to be inserted and stacked, the height of which can be adjusted according to a number of the discs 12.

The disc pushers 50 are provided in a radial direction relative to the discs 12 stacked in the hub unit 40. In this case, three disc pushers 50 are installed at intervals of 120 degrees. The disc pushers 50 are mounted on a linear guide 56, which is moved back and forth by the driving unit 60.

The driving unit 60 includes a motor 62, a belt pulley 64 connected to the motor 62 and the disc pushers 50, and a link 66 which is linearly moved by the belt pulley 64 and simultaneously moves the disc pushers 50 back and forth. The driving unit 60 may have various configurations known or to be known, such as a cylindrical actuator, which enables the disc pushers 50 to move back and forth, as well as a configuration which enables the disc pushers 50 to move back and forth by the motor 62.

The biasing units 70 are installed in a radial direction relative to the hub unit 40. In this case, three biasing units 70 are installed at intervals of 120 degrees.

Figure 3:
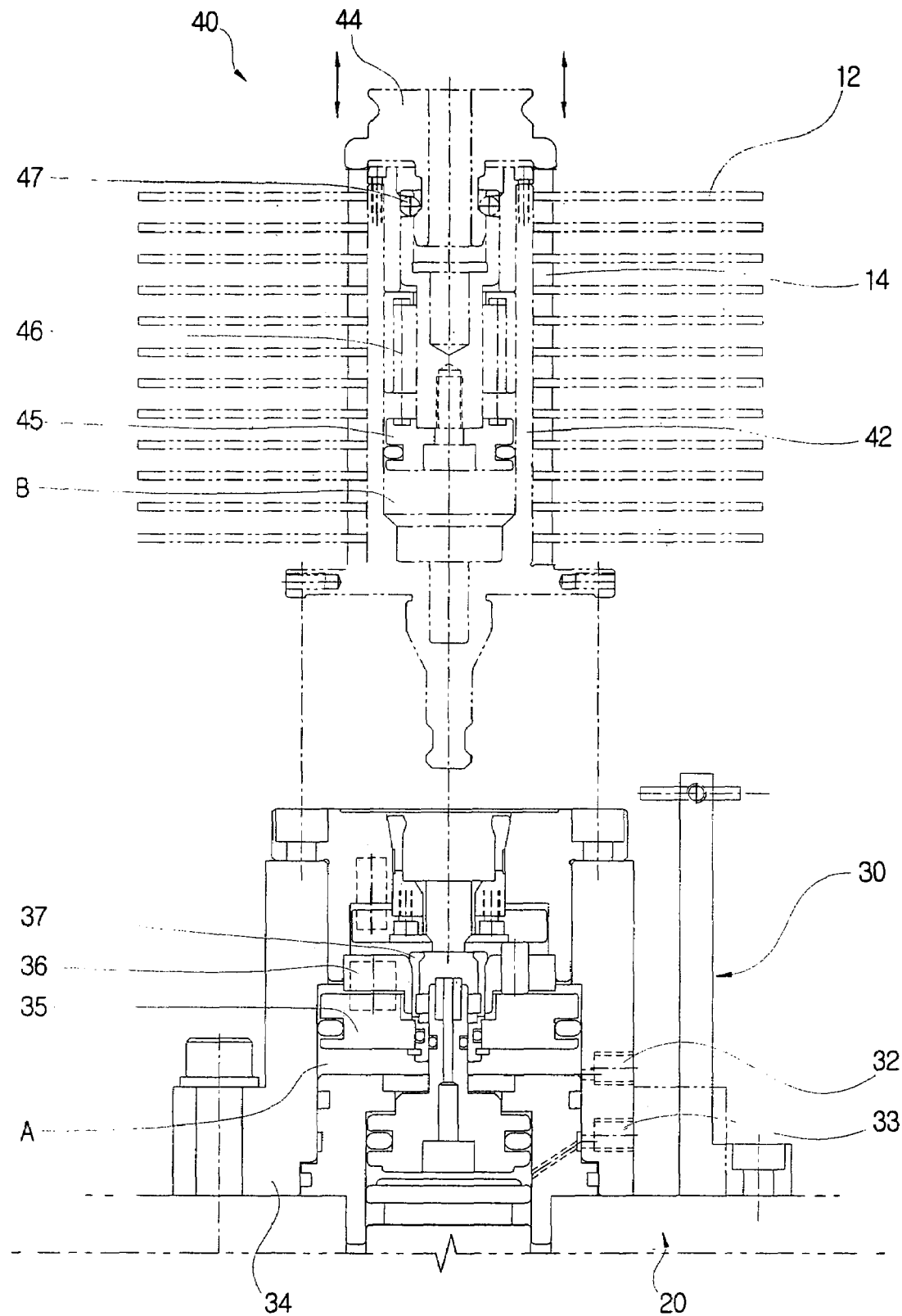
FIG. 3 is an exploded view of a chuck and a hub unit of the disc centering device shown in FIGS. 1 and 2.
Figure 4:
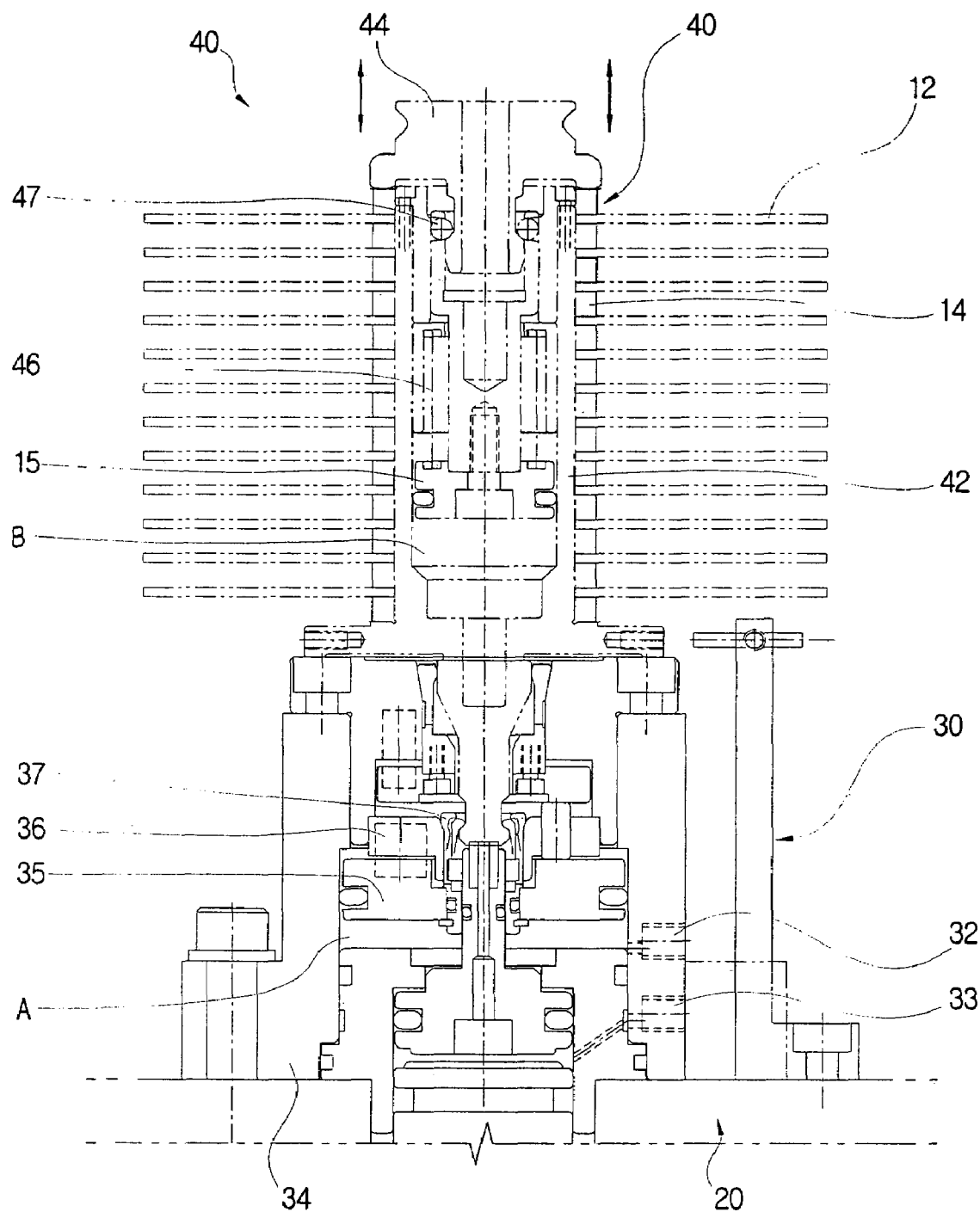
FIG. 4 is a front view of the chuck and the hub unit which are engaged with respect to the disc centering device shown in FIGS. 1 and 2.

FIG. 3 shows an exploded view of the chuck 30 and the hub unit 40 of the disc centering device shown in FIGS. 1 and 2. FIG. 4 shows a view similar to FIG. 3, except the chuck 30 and the hub unit 40 of the disc centering device are engaged.

As shown in FIGS. 3 and 4, the chuck 30 includes a chuck body 34 installed on the base plate 20, a first piston 35 which is provided in the chuck body 34 and rises according to a provision of a compressed air, a first piston spring 36 which pushes the first piston 35 on an upper part thereof, and a collet 37 which grabs or relieves the hub unit 40 according to an up or down movement of the first piston 35.

The hub unit 40 includes a hub body 42 which is detachably engaged to the chuck 30 and receives the discs 12 to be stacked, and a hub cap 44 which moves up or down with respect to an upper part of the hub body 42 and pushes the plurality of stacked discs 12. The hub unit 40 further includes a second piston 45, a second piston spring 46 which pushes the second piston 45 on an upper part thereof, and rising balls 47 which enable the hub cap 44 to be detached according to the up or down movement of the second piston 45.

The collet 37 of the chuck 30 moves up or down by a compressed air provided to an interior space "A" through the first air port 32, and the hub cap 44 of the hub unit 40 moves up or down by a compressed air provided to an interior space "B" through the second air port 33.

A state of engagement and operation of the chuck 30 and the hub unit 40 are described below.

Where a compressed air is provided to the interior space "A" through the first air port 32 formed with the chuck 30, the collet 37 moves up and gets wider. Herein, where the provision of the compressed air through the first air port 32 is cut off after inserting the hub body 42 of the hub unit 40 into the collet 37, the collet 37 moves down by the first piston spring 36 and chucks the hub body 42.

Where the discs 12 and the spacers 14 are completely and sequentially stacked with respect to a circumference of the hub body 42, the rising balls 47 in the hub body 42 move up by the second piston 45 and move in a radial direction relative to an vertical axis of the hub body 42, as a compressed air is provided to the interior space "B" through the second air port 33, so as to assemble the hub cap 44.

After assembling the hub cap 44, where the second air port 33 is cut off, the hub cap 44 is moved down along with the rising balls 47 as the rising balls 47 fall by the second piston spring 46. Accordingly, the hub cap 44 stably pushes the discs 12 and the spacers 14 with respect to the hub unit 40.

Figure 5:
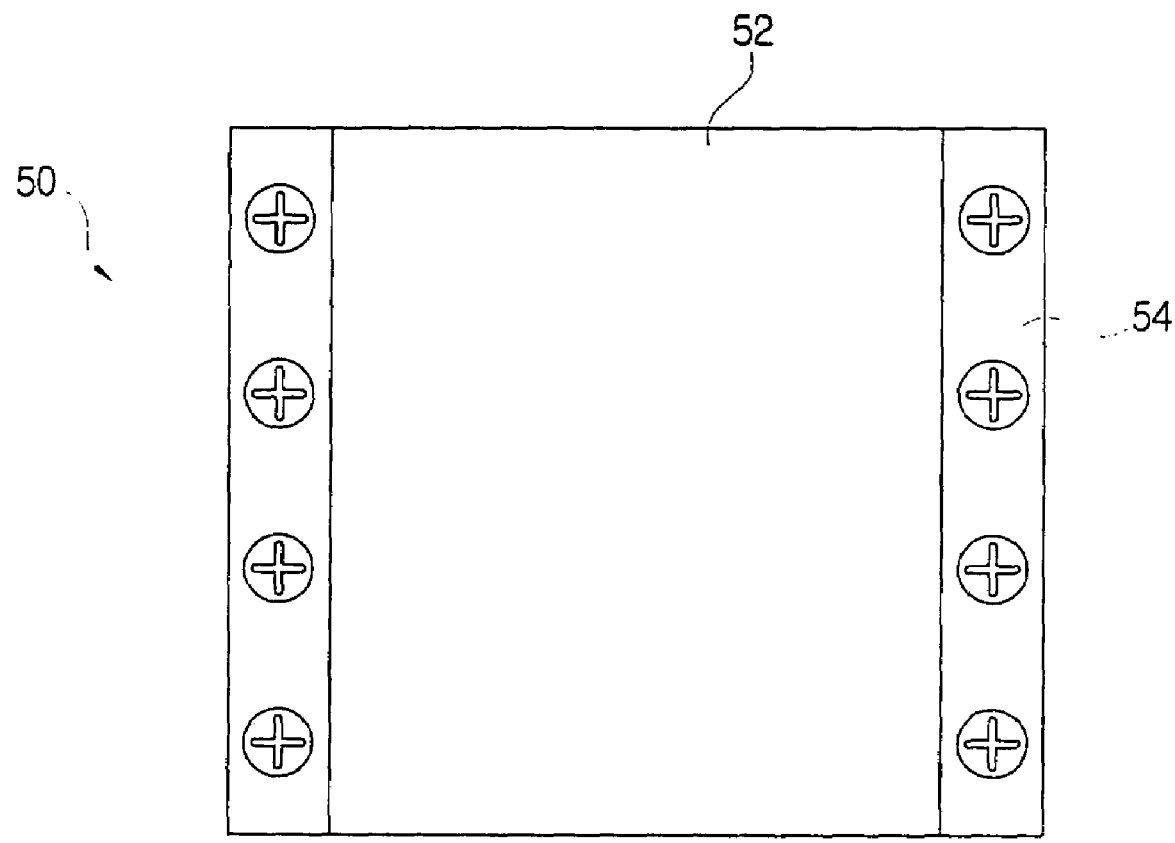
FIG. 5 is a plan view of a pressure member provided in the disc centering device according to the present invention.

FIG. 5 shows the pressure member 52 provided to the disc pushers 50 of the disc centering device according to the present invention.

As shown in FIG. 5, the pressure member 52 may be realized through one or more elastic members capable of pushing the circumferences of the discs 12 having different diameters, so as to center the discs 12 simultaneously. On the other hand, a plate spring adapted to simultaneously pressurize the discs 12 can be used. For example, the plate spring can be fixed onto the disc pusher 50 by one or more fixing units 54.

Figure 6:
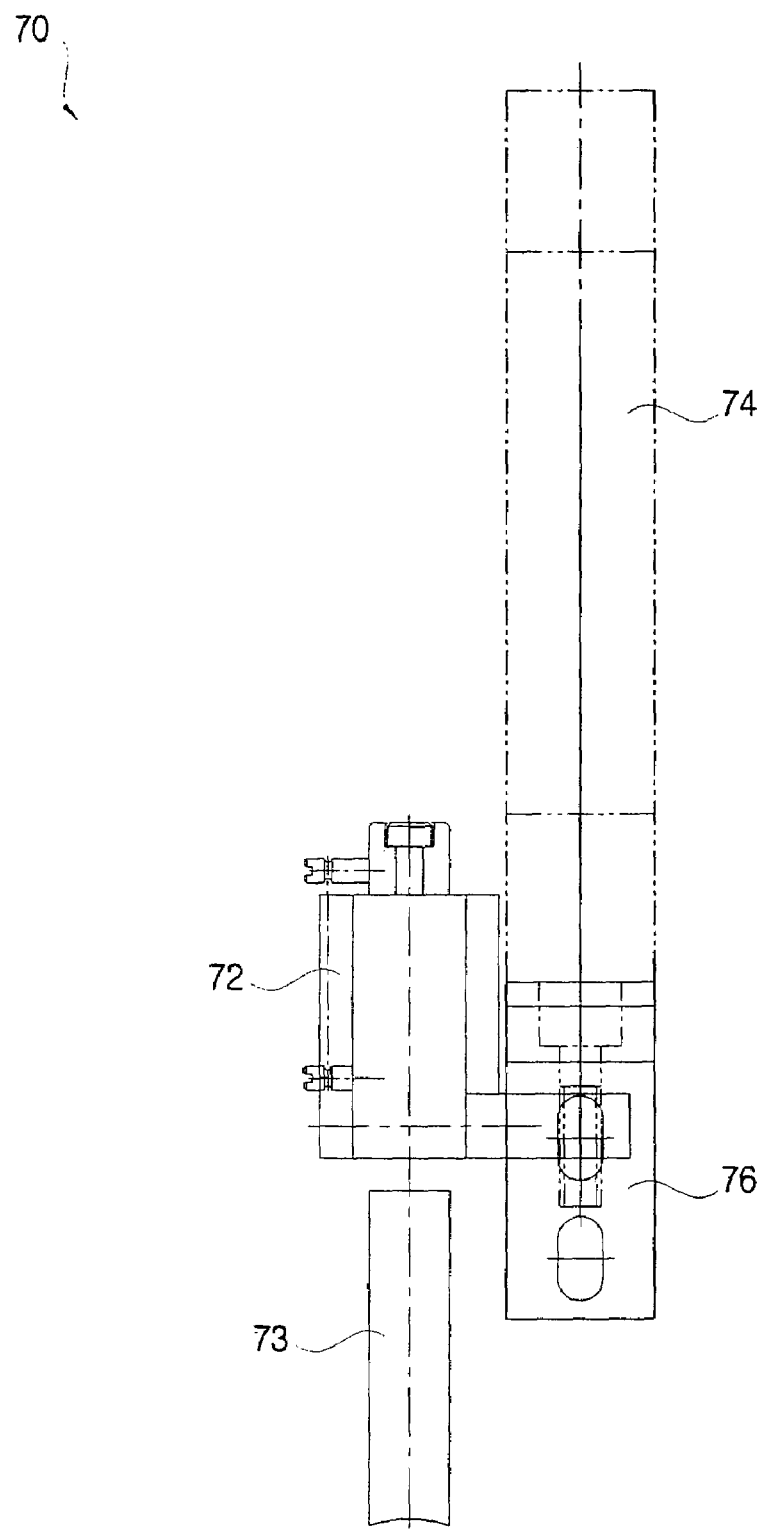
FIG. 6 is a plan view of a biasing unit of the disc centering device shown in FIGS. 1 and 2.
Figure 7:
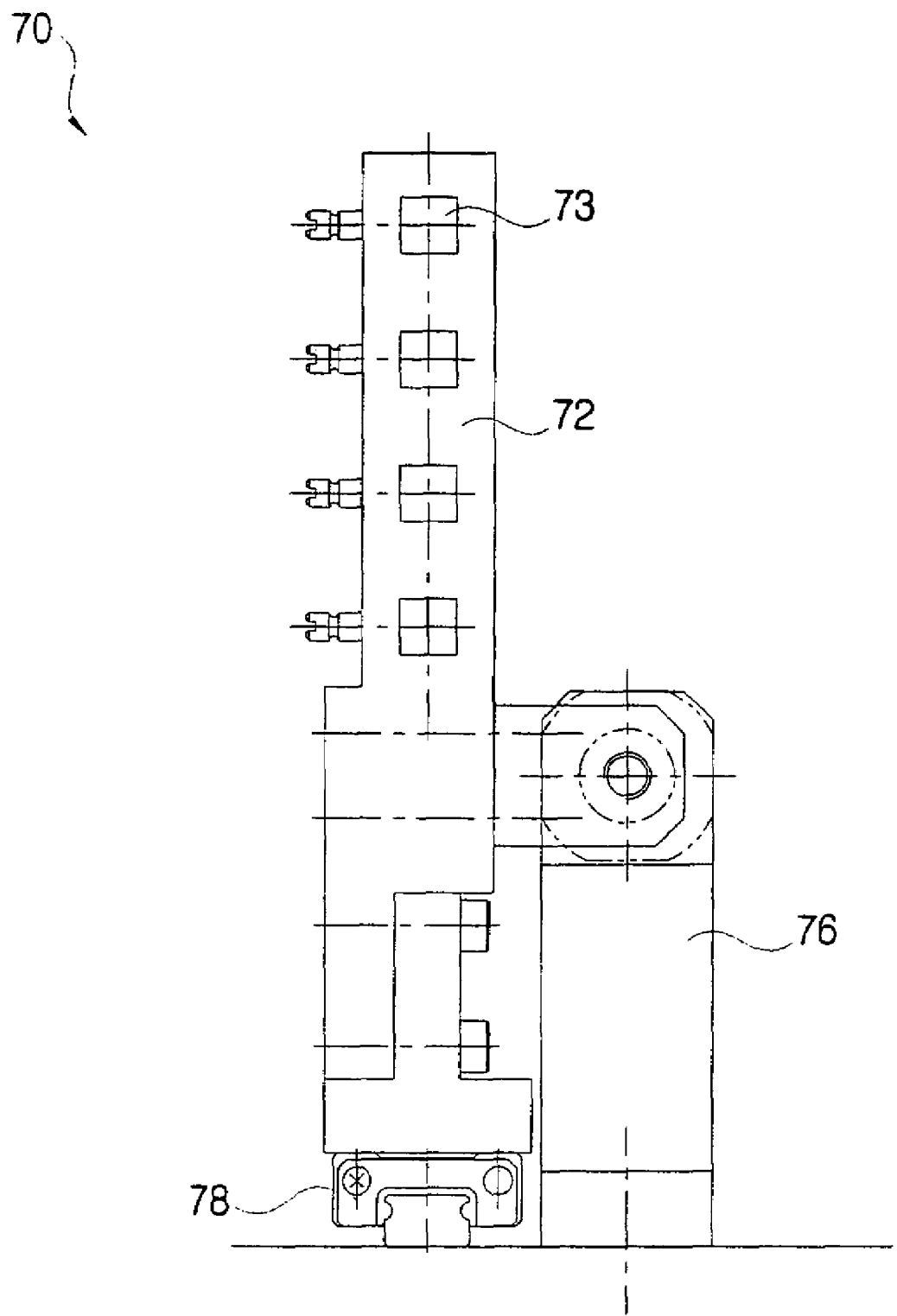
FIG. 7 is a front view of the biasing unit of the disc centering device shown in FIG. 6.
Figure 8A:
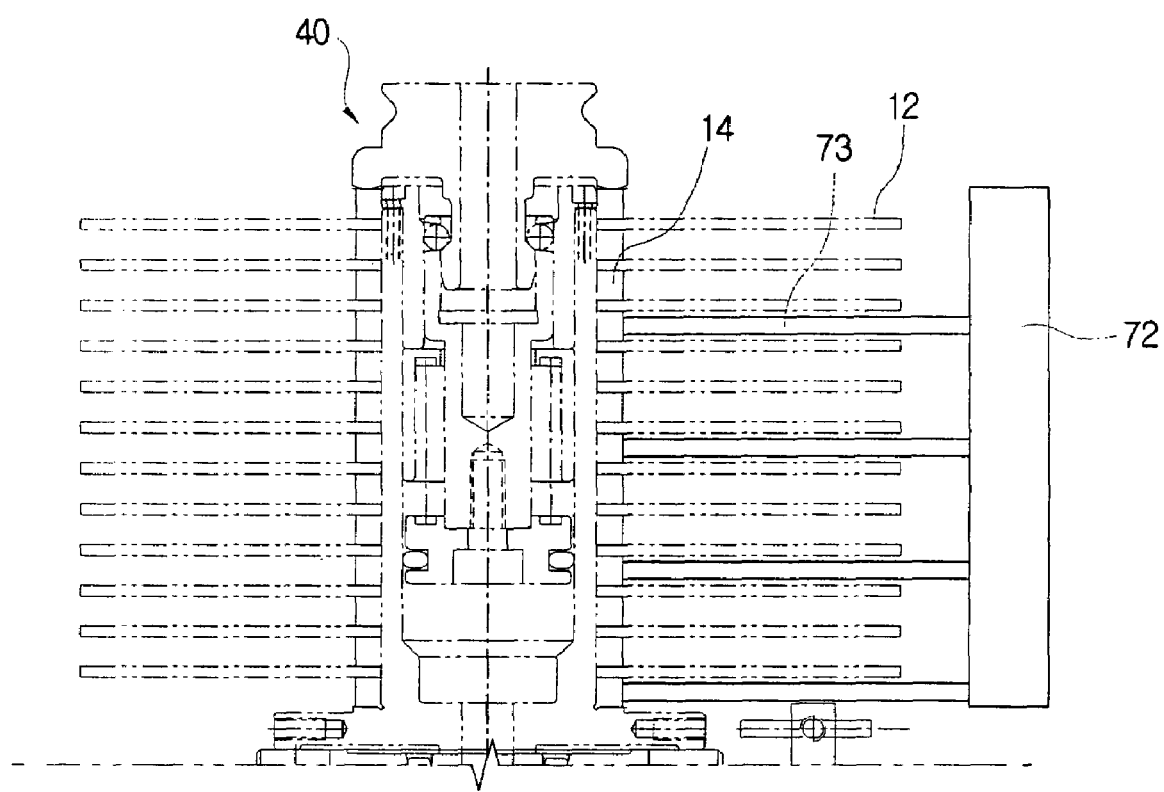
FIGS. 8A, 8B and 8C are views illustrating biasing states of respective biasing units of the disc centering device shown in FIGS. 1 and 2.
Figure 8B:
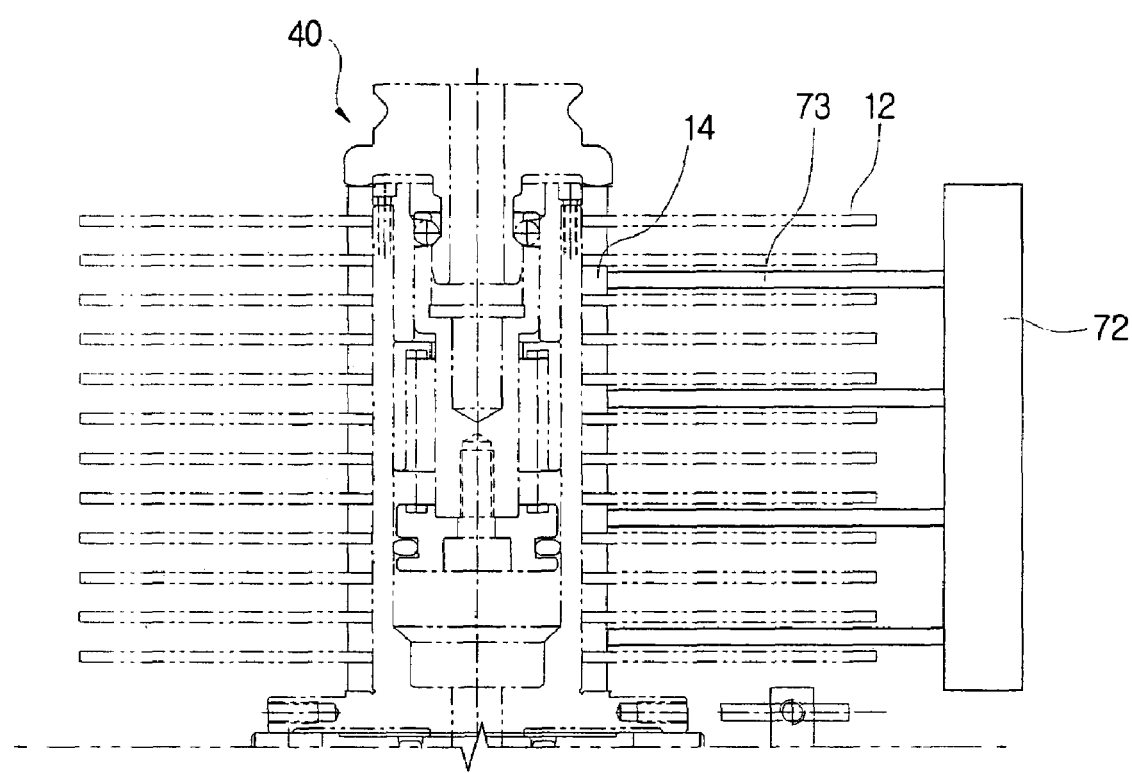
Figure 8C:
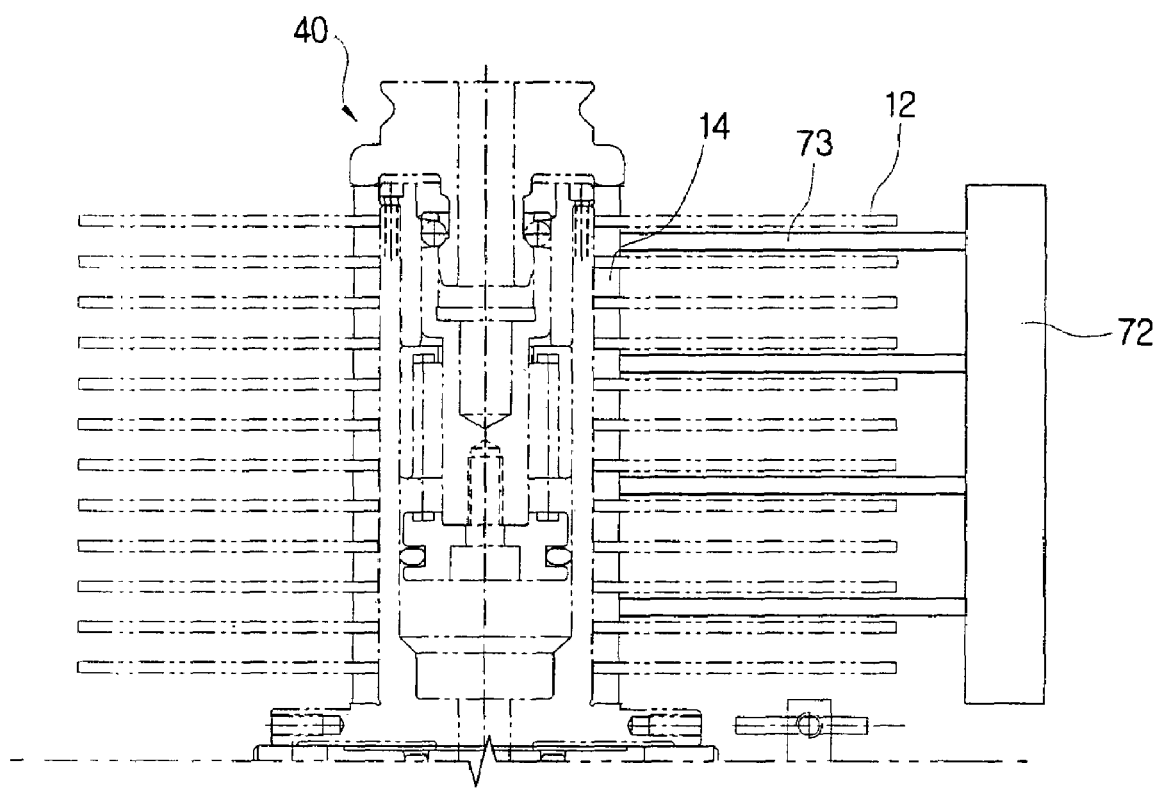

FIG. 6 shows a plan view of a biasing unit of the disc centering device according to the present invention. FIG. 7 is a front view of the biasing unit shown in FIG. 6. FIGS. 8A, 8B and 8C are views illustrating biasing states of respective biasing units of the disc centering device according to the present invention.

As shown in FIGS. 6 through 8C, each of the biasing units 70 includes a holder 72 having one or more rods 73 which push a group of spacers 14 stacked with respect to a circumference of the hub body 42, and a holder driving unit 74 which drives the corresponding holder 72 to move back and forth.

The rods 73 are thin and extended to be inserted between the discs 12, and bias the spacers 14, to thereby prevent the discs 12 from becoming eccentric during a rotation of the discs 12. The rods 73 can be uniformly divided correspondingly to the number of the stacked spacers 14, so as to simultaneously pressurize the spacers 14.

For example, assuming three biasing units 70 are installed at intervals of 120 degrees and thirteen spacers 14 are sequentially stacked, one group of the rods 73, as shown in FIG. 8A, biases 1, 4, 7 and 10th spacers of the spacers 14 relative to an axis of the hub unit 40, another group of the rods 73, as shown in FIG. 8B, biases 2, 5, 8 and 11th spacers of the spacers 14, and the third group of the rods 73, as shown in FIG. 8C, biases 3, 6, 9 and 12th spacers of the spacers 14. A number and arrangement of the rods 73 can be varied according to a number of the spacers 14 to be stacked. As shown in FIGS. 8A–8C, a top spacer may be placed on top of the $12^{th}$ disc 12.

A cylindrical actuator may be used as the holder driving unit 74. Additionally, the holder driving unit 74 can have a various configuration known or to be known, such as a rack and pinion (not shown), to simultaneously move the holders 72 back or forth by being linearly moved through a rotation of a motor (not shown).

Referring back to FIG. 7, a reference number 76 refers to a connection block, and a reference number 78 refers to a linear guide.

Figure 9A:
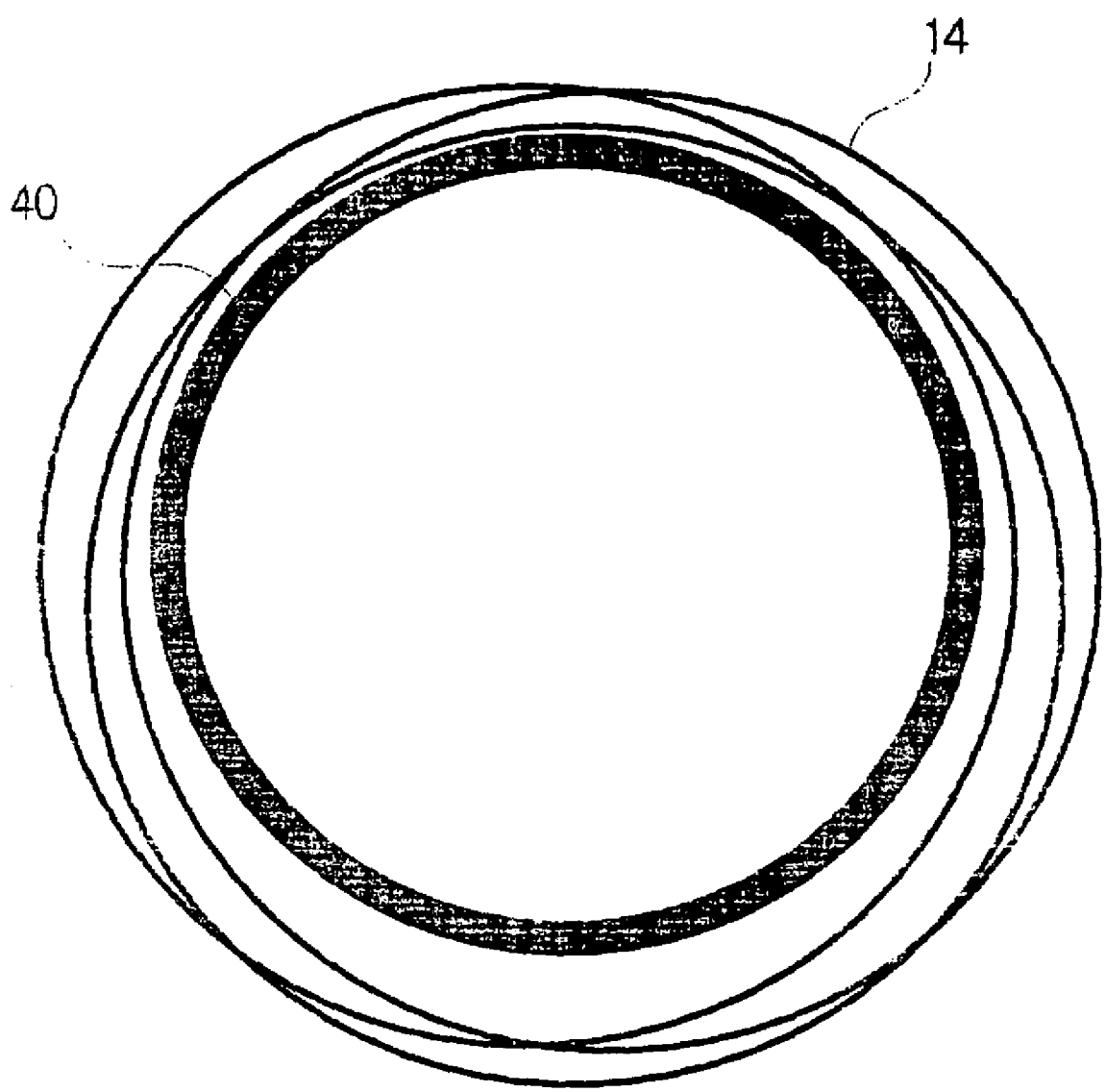
FIGS. 9A and 9B are views illustrating states before and after a spacer biasing of the disc centering device shown in FIGS. 1 and 2.
Figure 9B:
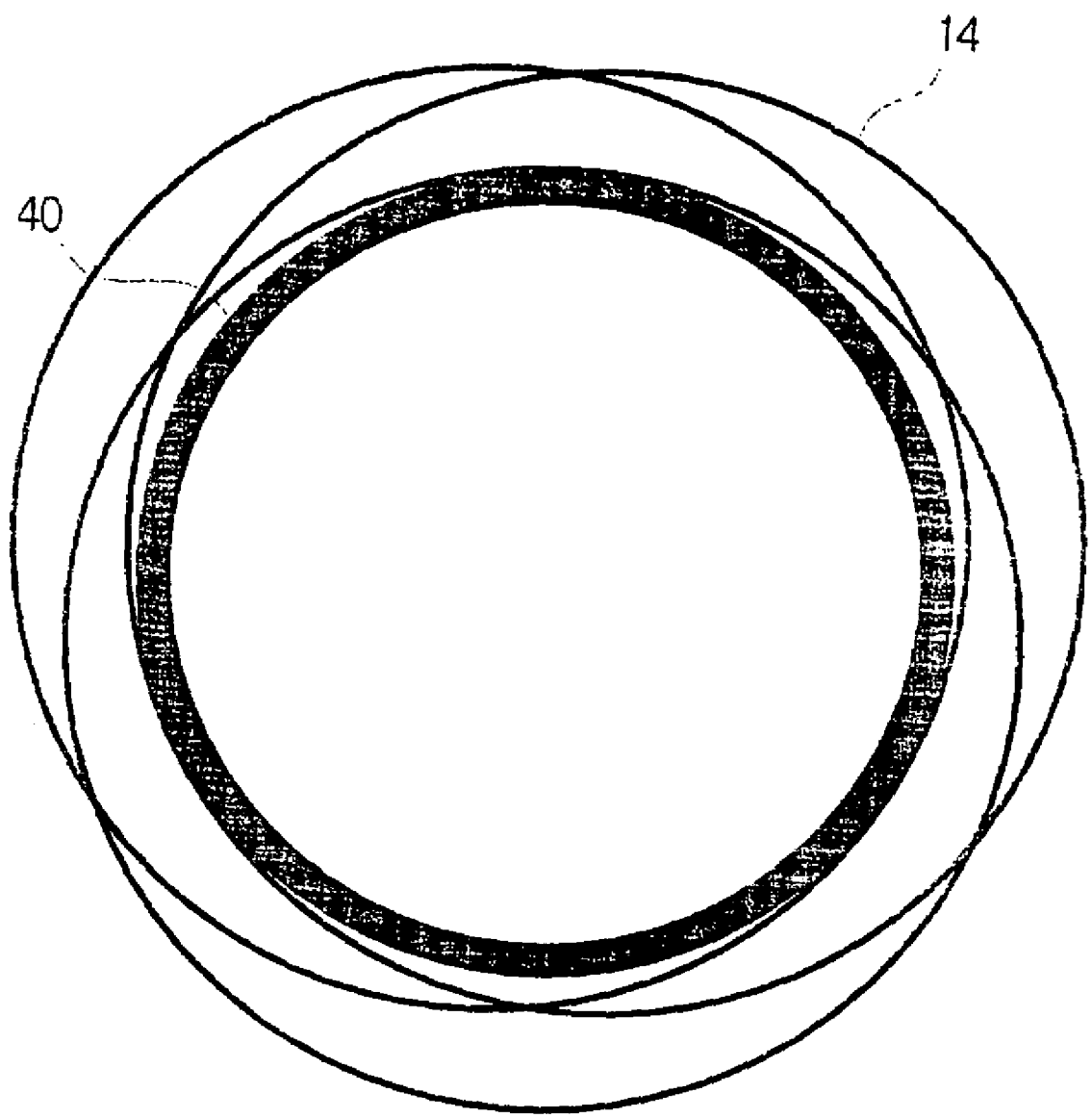

FIGS. 9A and 9B illustrate before and after a spacer biasing of the disc centering device according to the present invention.

As shown in FIG. 9A, where the non-biased spacers 14 are rotated, the spacers 14 are pushed outward, and accordingly, the discs 12 are also pushed outward simultaneously, thereby decreasing the accuracy of a disc centering. In contrast, as shown in FIG. 9B, where the spacers 14 are biased and rotated, the spacers 14 are not pushed outward. Therefore, the accuracy of the disc centering is increased by utilizing the space biasing operation.

That is, even though vibration of a rotation body, which may occur due to an unbalance of the discs 12, is minimized by centering the discs 12, the accuracy of the disc centering can be relatively decreased owing to a movement of the spacers 14 interposed between the discs 12. To solve this, the spacers 14 are biased so as to increase the accuracy of the disc centering.

An operation of the disc centering device is further described below.

After installing the chuck 30 on the base plate 20, where the hub body 42 of the hub unit 40 is placed into the collet 37 provided in the chuck 30, and simultaneously, a compressed air provided through the first air port 32 is cut off, the collet 37 moves down to chuck the hub body 42. Before the hub body 42 is placed into the collet 37 provided in the chuck 30, the compressed air is provided through the first air port 32 to maintain the up movement of the collet 37.

A preparation to center the discs 12 is completed by assembling the hub cap 44 with the hub body 42 after sequentially stacking the spacers 14 and the discs 12 with respect to the hub body 42.

Where the driving unit 60 is operated by power, the disc pushers 50 spaced from the hub unit 40 simultaneously moves forward, and in response, the discs 12 stacked in the hub unit 40 are centered. Where a centering is completed, the biasing units 70 move forward simultaneously, bias the spacers 14 interposed between the discs 12, and are retrieved thereafter.

Where the centering and the spacer biasing are completed, a compressed air provided through the second air port 33 is cut off, and accordingly, the hub cap 44 moves down, thereby allowing the hub cap 44 to compress and clamp the discs 12 and the spacers 14. Before the centering is completed, the compressed air is provided through the second air port 33 to maintain the rise of the hub cap 44.

Once the clamping is completed, the disc pushers 50 are retrieved and a compressed air is provided again through the first air port 32 to thereby produce the hub unit 40, of which the centering is completed.

As described above, using a disc centering device of the present invention, and by performing a spacer biasing along with a disc centering, the accuracy of a centering is increased. Accordingly, the quality of the discs having data recorded thereon is made uniform. Additionally, vibration of a rotation body can be minimized due to the simple configuration the disc centering device.

Thus, the productivity and manufacturability of HDDs are improved in view of the simplified maintenance and repair of the disc centering device.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A disc centering device for centering discs which are spaced by spacers, comprising:
 a base plate;
 a chuck which is installed on the base plate;
 a hub unit which is detachably engaged to the chuck and receives the discs to be stacked;
 disc pushers which are slidably provided outside the hub unit and include corresponding pressure members which push circumferences of the discs and center the discs;
 a driving unit which slides the disc pushers; and
 biasing units which are slidably provided outside the hub unit and push circumferences of the spacers.

2. The disc centering device according to claim 1, wherein the chuck includes a collet which grabs or relieves the hub unit according to whether a compressed air is provided to the chuck.

3. The disc centering device according to claim 1, wherein the hub unit comprises:
 a hub body which is detachably engaged to the chuck and receives the discs; and
 a hub cap which moves up or down to compress the discs with respect to the hub body.

4. The disc centering device according to claim 3, wherein the hub cap moves up or down according to whether a compressed air is provided to the hub unit.

5. The disc centering device according to claim 1, wherein the disc pushers are provided in a radial direction relative to the hub unit.

6. The disc centering device according to claim 5, wherein the disc pushers include first, second and third disc pushers which are provided at intervals of 120 degrees with respect to the hub unit.

7. The disc centering device according to claim 1, wherein the driving units includes:
 a motor;

a belt pulley which is connected to the motor and the disc pushers; and a link which is linearly moved by the belt pulley and simultaneously moves the disc pushers back or forth.

8. The disc centering device according to claim 1, wherein the driving unit includes cylindrical actuators which drive the corresponding disc pushers.

9. The disc centering device according to claim 1, wherein each of the pressure members includes a plate spring which is adapted to simultaneously pressurize the circumferences of the discs having different diameters.

10. The disc centering device according to claim 1, wherein each of the biasing units includes:

a holder having one or more rods which push the spacers; and a holder driving unit which moves the holder back and forth.

11. The disc centering device according to claim 10, wherein a number of the rods corresponds to a number of the stacked spacers so as to simultaneously pressurize the spacers.

12. The disc centering device according to claim 10, wherein each of the holder driving units includes:

a motor; and a rack and pinion which moves the corresponding holder having one or more rods back or forth by being moved linearly according to a rotation of the motor.

13. The disc centering device according to claim 12, wherein the rack and pinions of the holder driving units simultaneously move the holders back and forth to bias the spacers.

14. The disc centering device according to claim 10, wherein the holder driving units are cylindrical actuators.

15. The disc centering device according to claim 10, wherein the holder driving units of the biasing units simultaneously move the holders back and forth to bias the spacers.

16. The disc centering device according to claim 1, wherein the biasing units are installed in a radial direction relative to the hub unit.

17. The disc centering device according to claim 16, wherein the biasing units include first, second and third biasing units which are installed at intervals of 120 degrees with respect to the hub unit.

18. The disc centering device according to claim 1, wherein:

the biasing units include first, second and third biasing units which are provided in a radial direction relative to the spacers, and the first, second and third biasing units simultaneously bias the spacers stacked relative to the hub unit.

19. The disc centering device according to claim 18, wherein each of the first, second and third biasing units includes rods which pressurize a corresponding group of spacers.

20. The disc centering device according to claim 1, wherein:

the disc pushers move forward to contact and simultaneously center the discs, the biasing units move forward to contact and simultaneously bias the spacers, and the hub unit includes a hub cap which clamps the centered discs and biased spacers.

21. The disc centering device according to claim 1, wherein the biasing units bias the spacers so as to prevent the discs from becoming eccentric during a rotation of the discs.

22. The disc centering device according to claim 1, further comprising supporting units which support the corresponding pressure members with respect to the disc pushers so as to reinforce a restoring force of the pressure members.

23. A disc centering device for centering discs which are spaced by spacers, comprising:

a base plate;

a chuck which is installed on the base plate;

a hub unit which is detachably engaged to the chuck and receives the discs to be stacked; and a centering and biasing unit which is provided outside the hub unit, centers the discs and biases the spacers, wherein the centering and biasing unit comprises:

a disc centering unit having pushing members which simultaneously push circumferences of the discs to center the discs, and a spacer biasing unit having biasing rods which simultaneously bias the spacers.

* * * * *